United States Patent [19]

Boocock

[11] Patent Number: 4,801,656
[45] Date of Patent: Jan. 31, 1989

[54] PROCESS FOR SULPHONATING MOLTEN POLYOLEFINS

[75] Inventor: John R. Boocock, Kingston, Canada

[73] Assignee: Du Pont Canada, Mississauga, Canada

[21] Appl. No.: 5,244

[22] Filed: Dec. 19, 1986

Related U.S. Application Data

[62] Division of Ser. No. 756,225, Jul. 18, 1985.

[30] Foreign Application Priority Data

Jun. 27, 1985 [CA] Canada ................................. 485652

[51] Int. Cl.$^4$ .............................................. C08F 8/36
[52] U.S. Cl. ..................................... 525/344; 525/240
[58] Field of Search .................... 525/344, 240, 194

[56] References Cited

U.S. PATENT DOCUMENTS

| | | | |
|---|---|---|---|
| 3,072,619 | 1/1963 | Turbak | 525/344 |
| 4,220,573 | 9/1980 | Bock | 525/344 |
| 4,304,702 | 12/1981 | Makowski | 525/344 |

*Primary Examiner*—Christopher Henderson

[57] ABSTRACT

A polyolefin that has been modified with sulphur trioxide/trimethylamine complex is disclosed. The polyolefin may be homopolymer or copolymer of alpha-olefins selected from the group consisting of alpha-olefins having 2–10 carbons atoms, such alpha-olefins being hydrocarbon. Preferred polymers are homopolymers of ethylene or propylene, or copolymers of ethylene and at least one $C_3$–$C_{10}$ alpha-olefin. The modified polyolefin is preferably formed by admixing molten polyolefin with 20–2000 ppm of the complex at a temperature of at least 210° C. The modified polyolefin is dyeable.

2 Claims, No Drawings

PROCESS FOR SULPHONATING MOLTEN POLYOLEFINS

BACKGROUND OF THE INVENTION

This is a division of application Ser. No. 756,225, filed July 18, 1985.

FIELD OF THE INVENTION

The present invention relates to modified polyolefins and especially to polyolefins that have been modified by treatment with sulphur trioxide/trimethylamine complex.

DESCRIPTION OF THE PRIOR ART

Polymers of ethylene and/or other hydrocarbon alpha-olefins, espcially homopolymers of ethylene or propylene and copolymers of ethylene with $C_3$–$C_{10}$ alpha olefins, may be fabricated into a wide variety of articles, including film, fibres, sheet, moulded articles and/or pipe. If such articles are desired in a colour other than the natural colour of the polymer, it is often possible to pigment the polymer or, especially if the polymer surface has been suitably treated, to print the fabricated article.

The use of pigments and/or printing techniques depends on the nature of the fabricated article and the process used in the manufacture of the article. For example, if it is desired to produce a coloured polyolefin film, small amounts of pigment may be incorporated into the polymer composition prior to or during extrusion of the composition into film. However, coloured films produced in this manner are normally much less transparent than films produced from compositions that do not contain pigments. If the natural transparency of the polymer is to be retained, other means e.g. dyeing, must be used to colour the polymer composition.

Although it is known that polyolefins are dyeable by a small number of dyes, polyolefins are generally characterized as not being receptive to dyes in the absence of modification of the polymer to render it receptive to dyes. Techniques for such modification are known. For instance, a suitable comonomer may be copolymerized into the polyolefin during the manufacture of the polymer but such comonomers tend to be catalyst poisons and cannot be fed into some polymerization processes. Alternatively, polyolefins may be treated, in the presence of free-radical catalysts, to incorporate carboxyl, anhydride, hydroxyl and other potentially dye receptive sites into the polymer. However, processes for such treatment tend to be expensive, especially if unreacted monomers must be removed from the polymer and/or if complex apparatus is required. Dye receptive groups may also be introduced into polyolefins by blending the polyolefin with a polymer which is itself dyeable. The resultant blends may, however, be more expensive and/or have significantly different physical properties from those of the polyolefin per se.

SUMMARY OF THE INVENTION

A modified polyolefin, especially a polyolefin capable of being dyed with basic dyes, and a process for the manufacture of such a modified polyolefin in conventional equipment and in the absence of free-radical catalysts has now been found.

Accordingly, the present invention provides a modified polyolefin formed by the reaction of molten polyolefin with sulphur trioxide/trimethylamine complex, said polyolefin being a homopolymer or copolymer of alpha-olefins selected from the group consisting of alpha-olefin having 2–10 carbon atoms, or mixtures thereof, said alpha-olefin being a hydrocarbon.

In a preferred embodiment of the modified polyolefin of the present invention, the polyolefin is a homopolymer of ethylene or propylene, or a copolymer of ethylene and at least one $C_3$–$C_{10}$ alpha-olefin.

The present invention also provides a process for the manufacture of a modified polyolefin comprising the steps of:

(a) admixing molten polyolefin with 20–2000 ppm of sulphur trioxide/trimethylamine complex at a temperature above 210° C., said polyolefin being a homopolymer or copolymer of alpha-olefins selected from alpha-olefins having 2–10 carbon atoms, or mixtures thereof, said alpha-olefin being hydrocarbon, and (b) forming the modified polyolefin so obtained into a shaped article.

In a preferred embodiment of the process of the present invention, the polyolefin is a homopolymer of ethylene or propylene, or a copolymer of ethylene and at least one $C_3$–$C_{10}$ alpha-olefin.

In a further embodiment, the temperature of the molten polyolefin is above the melting point of the complex.

In another embodiment, the temperature of the molten polyolefin is 239–280° C.

DETAILED DESCRIPTION OF THE INVENTION

In the present invention, the polyolefins may be homopolymers of alpha-olefins having 2–10 carbon atoms, especially homopolymers of ethylene and of propylene. Alternatively, the polyolefins may be copolymers of alphaolefins having 2–10 carbon atoms, especially copolymers of ethylene with propylene, butene-1, hexene-1, 4-methylpentene-1 and/or octene-1. The polyolefins may be blends and/or admixtures of such homopolymers and copolymers. Techniques for the manufacture of these polyolefins are known in the art. In the present invention, the alphaolefins are hydrocarbons.

The polyolefins are normally solid polymers of the type known to be formed into articles by using extrusion, injection moulding and other forming techniques. For example, if the polymers are of the type frequently referred to in the trade as polyethylene viz. homopolymers of ethylene and copolymers of ethylene with $C_4$–$C_{10}$ alphaolefins, such polymers will have densities of at least about 0.890 g/cm$^3$, especially 0.915–0.970 g/cm$^3$, and melt indices (as measured by the procedure of ASTM D-1238 (Condition E)) of less than about 200 dg/min and especially less than about 150 dg/min. The melt index, in particular, will depend on the intended end-use of the polyolefin. For example, polyolefins intended for fabrication into film usually have a melt index of less than 10 whereas those intended for fabrication into articles by injection moulding techniques will usually have higher values of melt index. The present invention will generally be described herein with reference to polyethylene as the polyolefin.

The complex of sulphur trioxide and trimethylamine is known in the art. For example, the production of sulphur trioxide/trimethylamine complex is described in U.S. Pat. 3 334 139 of J. Rosin, issued Aug. 01, 1967.

The modified polyolefins of the present invention are formed by the reaction of the polyolefin with the sulphur trioxide/trimethylamine complex. A particularly preferred method involves reaction of the complex with molten polyolefin, as is described in further detail hereinafter.

It is preferred that the modified polyolefin be prepared by reaction with 20–2000 ppm of the complex. Even such low levels as 20 ppm of the complex result in a modified polyolefin that is dyeable, although the extent of dyeing that is possible, especially at short processing times, may not be acceptable for some end-uses. High levels of the complex may be incorporated into the polyolefin, but difficulties may be experienced in the preparation of the modified polyolefin. For example, with high levels of the complex, the resultant modified polyolefin may exhibit a dark hue and/or excess trimethylamine may remain in the modified polyolefin even after contact with a dye bath.

The modified polyolefin may be used in a variety of end-uses, it being understood that the preferred amount of the sulphur trioxide/trimethylamine complex in the modified polyolefin will likely be dependent on the intended end-use. For example, the modified polyolefins may be used as dyeable polymers, to promote adhesion to the polyolefin, to facilitate retention of additives in the polyolefin and the like.

In the preferred process for the manufacture of the modified polyolefin, molten polyolefin is admixed with 20–2000 ppm of the complex of sulphur trioxide and trimethylamine. The admixing is carried out at a temperature of above 210° C., especially above the melting point of the complex, and particularly at temperatures of less than about 45° C. above the melting point of the complex. It is preferred that the complex be admixed with the polyolefin at a temperature in the range of 239–280° C.

Even though it is stated herein that the polyolefin and complex be admixed at a temperature above 210° C., the complex and polyolefin should be first admixed, preferably uniformly admixed, at tempertures below 210° C. so as to obtain a uniform admixture of polyolefin and complex prior to any significant reaction therebetween. It is believed that high localized concentrations of the complex, as could occur in the event of poor mixing, may be detrimental in that minute dark particles may be formed which may be noticeable in thick sections of the modified polyolefin.

As is exemplified hereinafter, a preferred method of dispersing the complex in the polyolefin is to coat the complex onto particles of a compatible polyolefin that has a lower shear viscosity under melt processing conditions than does the polyolefin being modified, as is disclosed in the patent application of G. White filed concurrently herewith. The thus coated particles are admixed in suitable proportions, but as a concentrate, into the polyolefin being modified. Alternatively, the complex may be blended into the lower viscosity polymer at temperatures below 210° C., to form a blend (concentrate) that is then admixed with the polyolefin being modified. In such concentrates, it is preferred that the concentrate contain 200–40 000 ppm of the complex and that the polymer of the concentrate have a shear viscosity that is not more than 50% of that of the polymer of the intended composition, when measured at 200° C. and at a shear rate of 400 sec$^{-1}$.

A physical admixture of polyolefin and complex, in a suitable form, may be prepared prior to the feeding of the admixture to an extruder or the like; the suitable form may for example be coated polymer or a blend as discussed above. The polyolefin and complex are preferably of a similar particle size to facilitate uniform mixing, in the event that the complex is not coated on particles of the polymer.

In the admixing of the polymer and complex, it is preferred that a low temperature be used, provided that such temperature is above the melting point of the complex, to reduce the extent of any side reactions involving the complex and/or modified polyolefin.

The molten modified polyolefin thus obtained is formed into a shaped article. Such articles may be pellets or other comminuted forms of the modified polyolefin. However, it is preferred that the modified polyolefin be formed directly into film, moulded articles or the like.

The modified polyolefin may be admixed with stabilizers and other additives known for use in polyolefins, pigments, fillers and the like or subjected to dyeing processes. In dyeing processes, it is preferred that the dye bath does not contain so-called levellers e.g. sodium sulphate.

The present invention is further illustrated by the following examples. All parts, percentages and proportions are by weight unless otherwise indicated.

EXAMPLE I

An ethylene/butene-1 copolymer that had been ground in an Abbe* cutter equipped with a 0.48 cm mesh screen was physically blended with sulphur trioxidetrimethylamine complex obtained from Aldrich Chemical Co. of Milwaukee, WI, U.S.A. The copolymer was SCLAIR* 11K polyethylene which has a density of 0.920 g/cm$^3$ and a melt index of 1.4 dg/min. The resultant blend was fed to a 1.9 cm Brabender* single screw extruder equipped with a flat film die. The film thus obtained was cooled in air and wound up. The extruder was operated with a melt temperature of the copolymer of 273° C. in the barrel of the extruder and 268° C. in the die. The hold-up time of the copolymer in the extruder was estimated to be about 2.5–5 minutes.
*denotes trademark Samples of the film of a thickness of 40 μm were placed in an aqueous dye bath for 30 minutes. The dye bath contained 5 g/l of each of Maxilon* Blue GRL (300%) dye (C.I. Basic Blue 41) and Maxilon Red GRL (180%) dye (C.I. Basic Red 46), both of which were obtained from Ciba-Geigy Co. of Montreal, Quebec, Canada, 10 g/l of sodium sulphate and a trace of acetic acid that had been used to moisten the dye components prior to dissolution in the bath; the pH of the bath had been adjusted to 7.5 using 10% aqueous sodium hydroxide. The temperature of the dye bath was 95–100° C.
*denotes trade mark Film made from a blend containing 10 ppm of the complex became slightly tinted in the dye bath. With 500 ppm and with 1000 ppm of complex in the blend, good dyeability was observed to give a hue of violet to reddish-violet (C.I. #11, the colour shades herein being substantially as described according to "Permissible Hue Terms" of the "Hue Indication Chart" in the Colour Index, published by the Society of Dyers and Colourists, Bradford, U.K.), with the dyed film of the latter being almost opaque. An amine odour produced during manufacture of the film was almost entirely absent from the dyed film.

Film made from SCLAIR 11K polyethylene was not dyeable in the dye bath.

EXAMPLE II

The procedure of Example I was repeated using a melt temperature of 270° C. and a die temperature of 254° C.. A Sample A was prepared using 350 ppm of the complex and a Sample B was prepared using 1000 ppm of the complex. The films produced had a thickness of 160 μm.

In the dye bath, the films made from Samples A and B were each dyed to a hue of reddish-violet to blueish-red (C.I. #10).

EXAMPLE III

The film of Sample B of Exmaple II was dyed with a number of dyes. The dyes were in a dye bath of the type described in Example I at a concentration of 0.75 g/l and a pH of 6.5; sodium sulphate was not present in the dye bath. Dyeing time was 60 minutes at 98° C.

The dyes were:

(i) Maxilon Blue GRL 300% (Ciba-Geigy Co.) which gave a reddish-violet to bluish-red hue (C.I. #10);

(ii) Sandocryl* Brilliant Yellow B6GL 200% (C.I. Basic Yellow 15, Sandoz Canada Inc., Dorval, Quebec, Canada) which gave a yellow to greenish yellow hue (C.I. #2);
*denotes trade mark (iii) Sandocryl Brilliant Red B-4G 200% (C.I. Basic Red 14, Sandoz) which gave a pink to yellowish-red hue (C.I. #9);

(iv) Sandocryl Blue B-3G 300% (C.I. Basic Blue 3, Sandoz) which gave a greenish-blue to blue hue (C.I. #15).

Attractive medium-dyed transparent films were produced. In contrast, films made from the unmodified polyethylene were dyed to an insignificant extent.
*denotes trade mark

EXAMPLE IV 32g of Shell* Type JY 600 polypropylene was reacted under an atmosphere of nitrogen in an electrically-heated Brabender Plasticorder* with 0.031 g of sulphur trioxide/trimethylamine complex for a period of five minutes at 260° C.. The resultant product had a dark hue in bulk form but substantially colourless film was pressed from the product.
*denotes trade mark Samples of the film were dyed with the following dyes for one hour, the dye concentration being 3.6 g/l and the pH of the bath being 6.5; sodium sulphate was not present in the dye bath:

(i) Sandocryl Brilliant Yellow B-6GL 200% (Sandoz) which gave a yellow to greenish-yellow hue (C.I. #2);

(ii) Sandocryl Brilliant Red B-F 200% (C.I. Basic Red 27, Sandoz) which gave a red hue between C.I. #8 and C.I. #9;

(iii) Sandocryl Blue B-BLE (C.I. Basic Blue 77, Sandoz) which gave a blue hue (C.I. #14).

In each case, the film was dyed to a transparent medium-dyed hue. In contrast, unmodified polypropylene was dyed to an insignificant extent by dyes (i) and (iii). The unmodifed polypropylene was dyed by dye (ii) but to a lesser extent than the modified polypropylene.

EXMAPLE V

About 1500g of SCLAIR 2114 polyethylene, an ethylene/butene-1 copolymer having a density of 0.924 g/cm$^3$ and a melt index of 53 dg/min, were ground in an Abbe* cutter equipped with a 0.48 cm mesh screen. About 45g of sulphur trioxide-trimethylamine complex was dissolved in 600 ml of distilled water at 50° C. and, with minimal delay, was distributed on the particles of polyethylene in a Henschel* mixer maintained at 90° C., Nitrogen was continuously passed through the mixer for a period of 20 minutes to remove water vapour. The resultant coated particles, which were still moist, were dried overnight in a vacuum oven at 95° C.
*denotes trade mark A masterbatch was prepared by extruding the thus dried mixture from a 1.90 cm single screw Brabender* extruder, equipped with a mixing screw, at a melt temperature of 182° C. The extrudate was cooled in a water bath, cut in a strand cutter and dried overnight under vacuum. The calculated amount of sulphur trioxide-trimethylamine complex in the masterbatch was 2.9% by weight.
*denotes trade mark A physical admixture of 23g of the masterbatch and 660g of SCLAIR 11K polyethylene, an ethylene/butene-1 copolymer having a density of 0.920 g/cm$^3$ and a melt index of 1.40 dg/min., was prepared. The admixture was extruded from the Barbender extruder, now equipped with a venting screw and a breaker plate, at a melt temperature of 256° C. to form cast film having a width of 13.5 cm and a thickness of 50 μm. The hold-up time in the extruder was estimated to be 2.5–5 minutes.

The films thus obtained were dyed in an aqueous dye bath, using a dye concentration of 3.6 g/l, a dyeing time of 60 minutes, a bath temperature of 95–100° C. and a dye bath pH of 6.5; sodium sulphate was not present in the dye bath. The results obtained were as follows:

(i) Sandocryl Brilliant Blue B-BLE (Sandoz) gave a blue to reddish-blue hue (C.I. #14);

(ii) Sandocryl Brilliant Red B-F (Sandoz) gave a red to bluish-red (red side) hue (C.I. #9);

(iii) Sandocryl Blue B-RLE (300%) (C.I. Basic Blue 41, Sandoz) gave a violet to bluish violet hue (C.I. #13);

(iv) Sandocryl Red B-BLE (Sandoz) failed to dye the film.

Films made from SCLAIR 2114 and SCLAIR 11K polyethylene were not dyeable with the above dyes.

I claim:

1. A process for the manufacture of a modified polyolefin comprising the steps of:

(a) admixing molten polyolefin with 20–2000 ppm of sulphur trioxide/trimethylamine complex at a temperature above 210° C., said polyolefin being a homopolymer or copolymer of alpha-olefins selected from alpha-olefins having 2–10 carbon atoms, and mixtures thereof, said alpha-olefin being a non-aromatic hydrocarbon, and (b) forming the modified polyolefin so obtained into a shaped article;

wherein molten polyolefin is admixed with a concentrate composition comprising a second polyolefin and said complex at a temperature below 210° C. prior to the admixing at a temperature above 210° C., said composition having been formed by admixing the second polyolefin in molten form with the complex at a temperature below 210° C., said second polyolefin having a shear viscosity that is not more than 50% of that of the polyolefin at 200° C. and a shear rate of 400 sec$^{-1}$.

2. The process of claim 1 in which the concentrate composition contains 200–40 000 ppm of the complex.

* * * * *